United States Patent [19]
Carr et al.

[11] Patent Number: 5,428,275
[45] Date of Patent: Jun. 27, 1995

[54] CONTROLLED STARTING METHOD FOR A GAS TURBINE ENGINE

[75] Inventors: Kenneth R. Carr, Redmond, Wash.; James A. Shippling, Rockford, Ill.; Leland E. Weber, Rockford, Ill.; Malcolm J. McArthur, Rockford, Ill.

[73] Assignee: Sundstrand Corporation, Rockford, Ill.

[21] Appl. No.: 63,073
[22] Filed: May 12, 1993
[51] Int. Cl.$^6$ .............................................. H02P 1/46
[52] U.S. Cl. .................................... 318/146; 318/715
[58] Field of Search ............... 318/146, 147, 712, 715, 318/717, 719, 721–723; 290/10, 13, 24, 26, 33, 35, 37 R, 41; 324/378, 380, 381; 123/179.5, 179.27–179.29; 60/39.02, 39.141, 39.142

[56] References Cited

U.S. PATENT DOCUMENTS

| | | | |
|---|---|---|---|
| 3,775,974 | 12/1973 | Silver | 60/39.34 |
| 3,902,073 | 8/1975 | Lafuze | 290/46 |
| 3,908,161 | 9/1975 | Messenger | 322/29 |
| 4,093,869 | 6/1978 | Hoffman et al. | 290/31 |
| 4,295,085 | 10/1981 | Lafuze | 318/721 |
| 4,354,126 | 10/1982 | Yates | 310/156 |
| 4,456,830 | 6/1984 | Cronin | 290/27 |
| 4,473,752 | 9/1984 | Cronin | 290/38 R |
| 4,684,081 | 8/1987 | Cronin | 244/58 |
| 4,687,961 | 8/1987 | Horber | 310/186 |
| 4,694,210 | 9/1987 | Elliott et al. | 310/68 R |
| 4,708,030 | 11/1987 | Cordner | 74/686 |
| 4,743,777 | 5/1988 | Shilling et al. | 290/46 |
| 4,772,802 | 9/1988 | Glennon et al. | 290/31 |
| 4,808,903 | 2/1989 | Matsui et al. | 318/800 |
| 4,841,216 | 6/1989 | Okada et al. | 322/10 |
| 4,868,406 | 9/1989 | Glennon et al. | 290/4 R |
| 4,900,231 | 2/1990 | Kennedy | 417/16 |
| 4,933,623 | 6/1990 | Fox | 322/25 |
| 4,935,686 | 6/1990 | Stacey | 318/801 |
| 4,939,441 | 7/1990 | Dhyanchand | 318/718 |
| 4,942,493 | 7/1990 | Rozman et al. | 361/23 |
| 4,947,100 | 8/1990 | Dhyanchand et al. | 322/10 |
| 4,949,021 | 8/1990 | Rozman et al. | 318/254 |
| 4,959,595 | 9/1990 | Nishimura | 318/138 |
| 4,967,334 | 10/1990 | Cook et al. | 363/34 |
| 4,968,926 | 11/1990 | Dhyanchand | 322/10 |
| 4,988,939 | 1/1991 | Reichard et al. | 318/800 |
| 4,992,721 | 2/1991 | Latos | 322/10 |
| 5,008,801 | 4/1991 | Glennon | 363/132 |
| 5,012,177 | 4/1991 | Dhyanchand et al. | 322/10 |
| 5,013,929 | 5/1991 | Dhyanchand | 290/31 |
| 5,015,927 | 5/1991 | Reichard | 318/139 |
| 5,015,941 | 5/1991 | Dhyanchand | 322/10 |
| 5,028,803 | 7/1991 | Reynolds | 290/31 |
| 5,029,263 | 7/1991 | Rozman | 318/714 |
| 5,040,366 | 8/1991 | Schulze | 60/39.08 |
| 5,051,670 | 9/1991 | De Piola | 318/434 |
| 5,055,700 | 10/1991 | Dhyanchand | 290/31 |
| 5,055,764 | 10/1991 | Rozman et al. | 322/10 |
| 5,068,590 | 11/1991 | Glennon et al. | 322/10 |
| 5,079,494 | 1/1992 | Reichard | 318/811 |
| 5,097,195 | 3/1992 | Raad et al. | 322/10 |
| 5,113,125 | 5/1992 | Stacey | 318/721 |
| 5,123,239 | 6/1992 | Rodgers | 60/39.02 |
| 5,132,604 | 7/1992 | Shimane et al. | 322/10 |
| 5,140,245 | 8/1992 | Stacey | 318/723 |

FOREIGN PATENT DOCUMENTS 2206751A 1/1989 United Kingdom .

OTHER PUBLICATIONS

E. Iizuka, et al., *IEEE Transactions on Industry Applications,* vol. 1A–21, No. 4, May/Jun. 1985.
Furuhashi, et al., *IEEE Transactions on Industrial Electronics,* vol. 39, No. 2, Apr. 1992.

*Primary Examiner*—William M. Shoop, Jr.
*Assistant Examiner*—Brian Sircus
*Attorney, Agent, or Firm*—Jeffery J. Makeever

[57] ABSTRACT

A method of controllably starting a prime mover, such as a gas turbine engine for an aircraft, in which the prime mover is coupled to a synchronous machine operable in a generating mode in which the synchronous machine converts motive power generated by the prime mover into electrical power and in a starting mode in which the synchronous machine provides motive power to the prime mover to accelerate the prime mover to self-sustaining speed includes three controlled phases: a pre-ignition phase, an ignition phase, and a torque augmentation phase. During each phase the prime mover is accelerated at a predetermined rate. When the motive power provided by the synchronous machine falls below a predetermined level, its operation is converted from its starting mode to its generating mode.

19 Claims, 5 Drawing Sheets

FIG. 1A
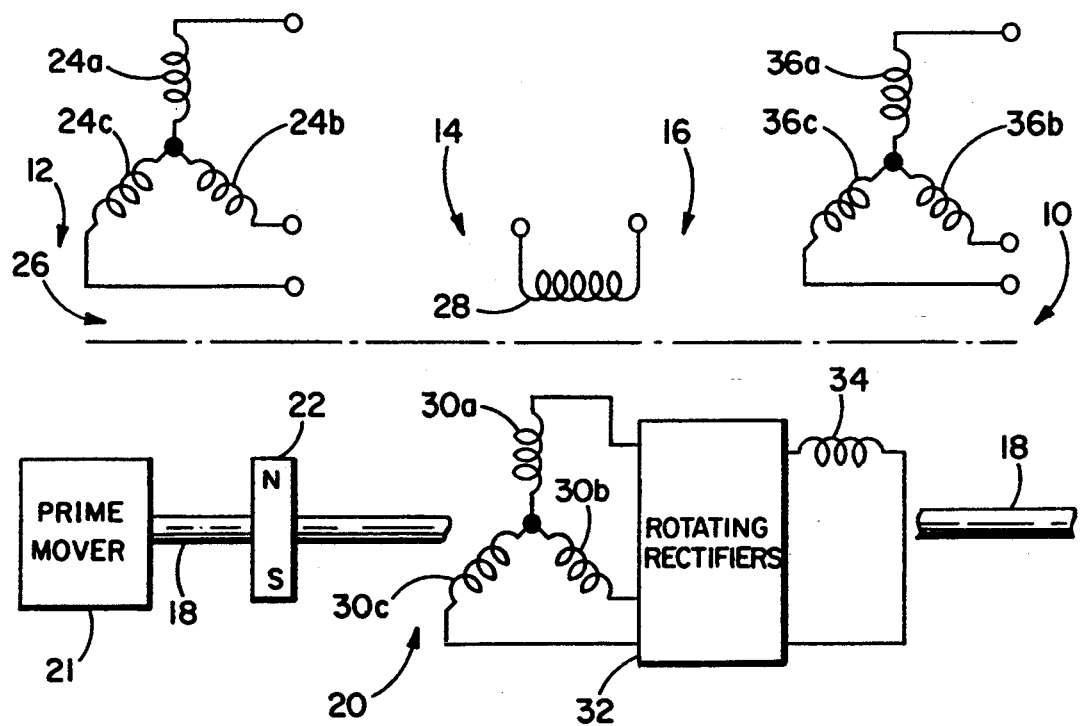
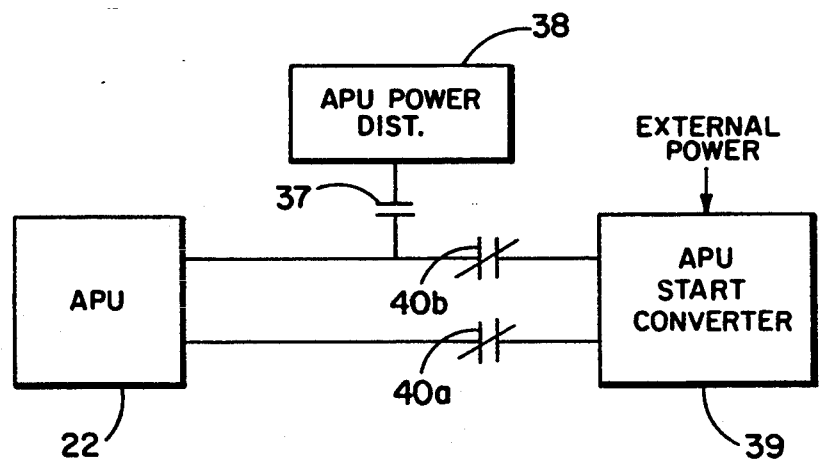
FIG. 1B

CONTROLLED STARTING METHOD FOR A GAS TURBINE ENGINE

TECHNICAL FIELD

The present invention relates to a starting method for a prime mover, such as a gas turbine engine for an aircraft, in which the acceleration of the prime mover is controlled in various phases.

BACKGROUND ART

In a typical start system four a gas turbine engine, for example, one used in an aircraft auxiliary power unit, a low voltage brush-type series-wound DC motor is coupled to the gas turbine engine via a clutch and gearbox. The DC motor is electrically connected to a source of power, such as a battery or a transformer rectifier unit (TRU), via high current feeders.

To start the gas turbine engine, low-voltage, high current electrical power is supplied to the DC motor from the source of power and the clutch is engaged. Due to the inherent characteristics of the series wound DC motor, the motor draws maximum current and produces maximum torque when startup is commenced, and as startup progresses, the current drawn and the torque produced decrease from their initial maximum values. As a result, the gas turbine engine is initially accelerated very rapidly in an uncontrolled manner.

The above manner of starting a gas turbine engine has a number of problems. The high current initially drawn by the DC motor requires the use of relatively large high-current feeders and also causes the power source voltage to decrease or droop by an undesirably large amount during the time period immediately following the commencement of engine start.

Also, the rapid, uncontrolled acceleration of the engine due to the high initial torque generated by the DC motor is undesirable since the engine may be driven through the speed range within which the engine ignition may occur too quickly, resulting in failure to ignite the engine.

Various alternative starting systems have been devised. For example, instead of having a DC motor coupled to the gas turbine engine via a clutch, a synchronous machine operable in both a starting mode and a generating mode has been drivably coupled to a prime mover. In the starting mode, the synchronous machine acts as a motor to provide motive power to the engine. In the generating mode, the synchronous machine acts as a generator to convert motive power generated by the prime mover to electrical power. Examples of such alternative systems are illustrated in U.S. Pat. Nos. 5,013,929 to Dhyanchand, 5,055,764 to Rozman, et al. and 5,068,590 to Glennon, et al.

SUMMARY OF THE INVENTION

The present invention is directed to a method of controllably starting a prime mover, such as a gas turbine engine in an aircraft auxiliary power unit, in which the prime mover is coupled to a starter motor which provides motive power to the prime mover to accelerate the prime mover to self-sustaining speed. The starter motor may be either a dedicated starter motor or a synchronous machine operable in both starting and generating modes.

The method includes three controlled phases: a first phase prior to ignition of the prime mover, a second phase during which the prime mover is ignited, and a third phase subsequent to the ignition of the prime mover. During the first phase, the starter motor provides motive power to the prime mover to accelerate the prime mover at a predetermined Irate while limiting the maximum DC supply current, and hence minimizing the energy source voltage drop.

This first phase could also initially slowly rotate the prime mover if the prime mover has cold, viscous oil in the bearings thereof so as to more efficiently use the total energy available from the energy source during start.

During the second phase, the prime mover is accelerated at a predetermined rate and fuel is provided to facilitate ignition of the prime mover. The acceleration rate of the prime mover during the second phase is preferably smaller than the rate of acceleration during the first phase. Providing a relatively slow, controlled rate of acceleration during the second phase increases the likelihood of ignition of the prime mover.

After ignition of the prime mover, during the third phase, the starter motor is accelerated at a predetermined rate to maximize the reliability of starting consistent with minimizing the energy drawn from the energy source. The predetermined rates of acceleration during the three starting phases are specified by an electronic control signal having a characteristic, such as magnitude, relating to the predetermined rates of acceleration.

Where the starter motor is a synchronous machine operable in both starting and generating modes, the starting method may include the step of detecting when the motive power provided by the synchronous machine falls below a predetermined level with the prime mover accelerating, whereupon the synchronous machine can cease to be in the starting mode.

The reliability of a directly-coupled starter motor, particularly of the AC type, is particularly higher than that of a brush-type DC motor and clutch.

These and other features and advantages of the present invention will be apparent to those of ordinary skill in the art in view of the detailed description of a preferred embodiment, which is made with reference to the drawings, a brief description of which is provided below.

BRIEF DESCRIPTION OF THE DRAWINGS

FIG. 1A comprises a combined block and schematic diagram of a brushless, synchronous generator;

FIG. 1B comprises a block diagram of an APU system together with a start converter;

DESCRIPTION OF THE PREFERRED EMBODIMENT

Figure 2A:
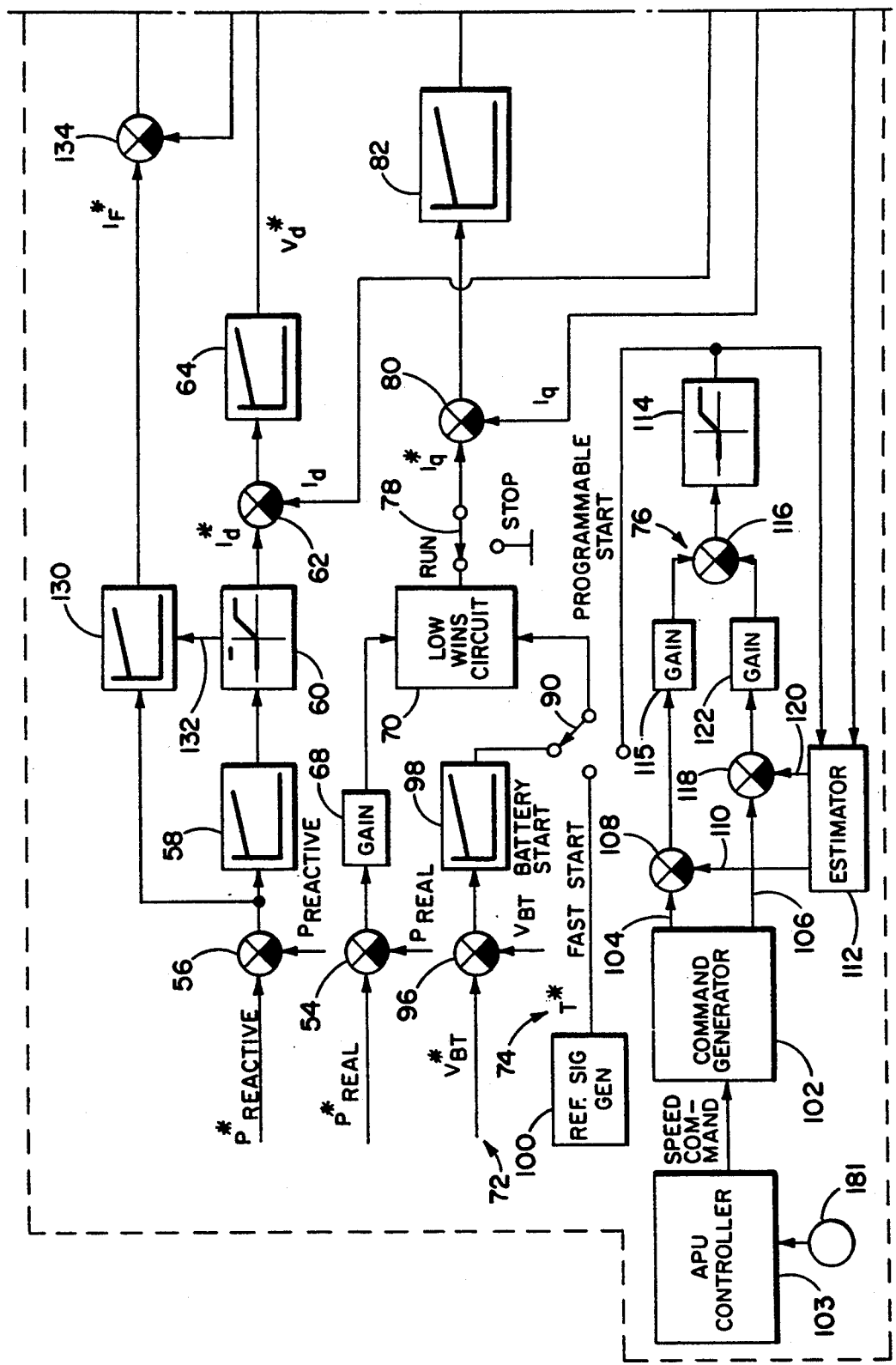
FIGS. 2A and 2B, when joined along the dashed lines, together comprise a block diagram of a control that may be used in connection with the starting method of the invention.

Referring now to FIG. 1A, a synchronous machine in the form of a brushless, synchronous generator 10 includes a permanent magnet generator (PMG) 12, an exciter portion 14 and a main generator portion 16. The generator further includes a motive power shaft 18 interconnecting a rotor 20 of the generator 10 and a prime mover 21, such as a gas turbine engine. In a specific application of the present invention, the generator 10 and the prime mover 21 together may comprise an aircraft auxiliary power unit (APU) 22, although the present invention is equally useful in other prime mover/generator applications.

The rotor 20 carries one or more permanent magnets 23 which form poles for the PMG 12. Rotation of the motive power shaft 18 causes relative movement between the magnetic flux produced by the permanent magnet 23 and a set of three-phase PMG armature windings including phase windings 24a–24c mounted within a stator 26 of the generator 10.

The exciter portion 14 includes a field winding 28 disposed in the stator 26 and a set of three-phase armature windings 30a–30c disposed on the rotor 20. A set of rotating rectifiers 32 interconnect the exciter armature windings 30a–30c and a main generator portion field winding 34 also disposed on the rotor 20. Three-phase main generator portion armature windings 36a–36c are disposed in the stator 26.

During operation in a generating mode, at least one, and preferably all three of the PMG armature windings 24a–24c are coupled through a rectifier and voltage regulator (not shown) to the exciter portion field winding 28. As the motive power shaft 18 is rotated, power produced in the PMG armature windings 24a–24c is rectified, regulated and delivered to the field winding 28. AC power is produced in the armature windings 30a–30c, rectified by the rotating rectifiers 32 and applied to the main generator portion field winding 34. Rotation of the motive power shaft 18 and the field winding 34 induces three-phase AC voltages in the main generator portion armature windings 36a–36c as is conventional. As seen in FIG. 1B,, the AC voltages are supplied through a contactor set 37 to an APU power distribution network 38 and thence to one or more loads (not shown).

Often, it is desirable to use the brushless generator 10 as a motor to bring the prime mover 21 up to self-sustaining speed. This operation is accomplished by providing electrical power to the main generator portion field winding 34 via the exciter 14, providing AC power to the main generator portion armature windings 36a–36c and suitably commutating the currents flowing in the windings 36a–36c to cause the motive power shaft 18 to rotate. In a specific embodiment, the electrical power for the generator 10 is developed by an APU start converter 39 which receives external electrical power and which is connected by contactor sets 40a, 40b to the exciter field winding 28 and the armature windings 36a–36c, respectively. Various methods have been devised for controlling the power supplied to the main generator field winding 34 via the exciter 14 and the power applied to the armature windings 36a–36c other than those described herein. Such other methods could be used in place of those described herein to accomplish the desired results, as should be evident to one of ordinary skill in the art, without departing from the spirit and scope of the present invention.

Figure 2B:
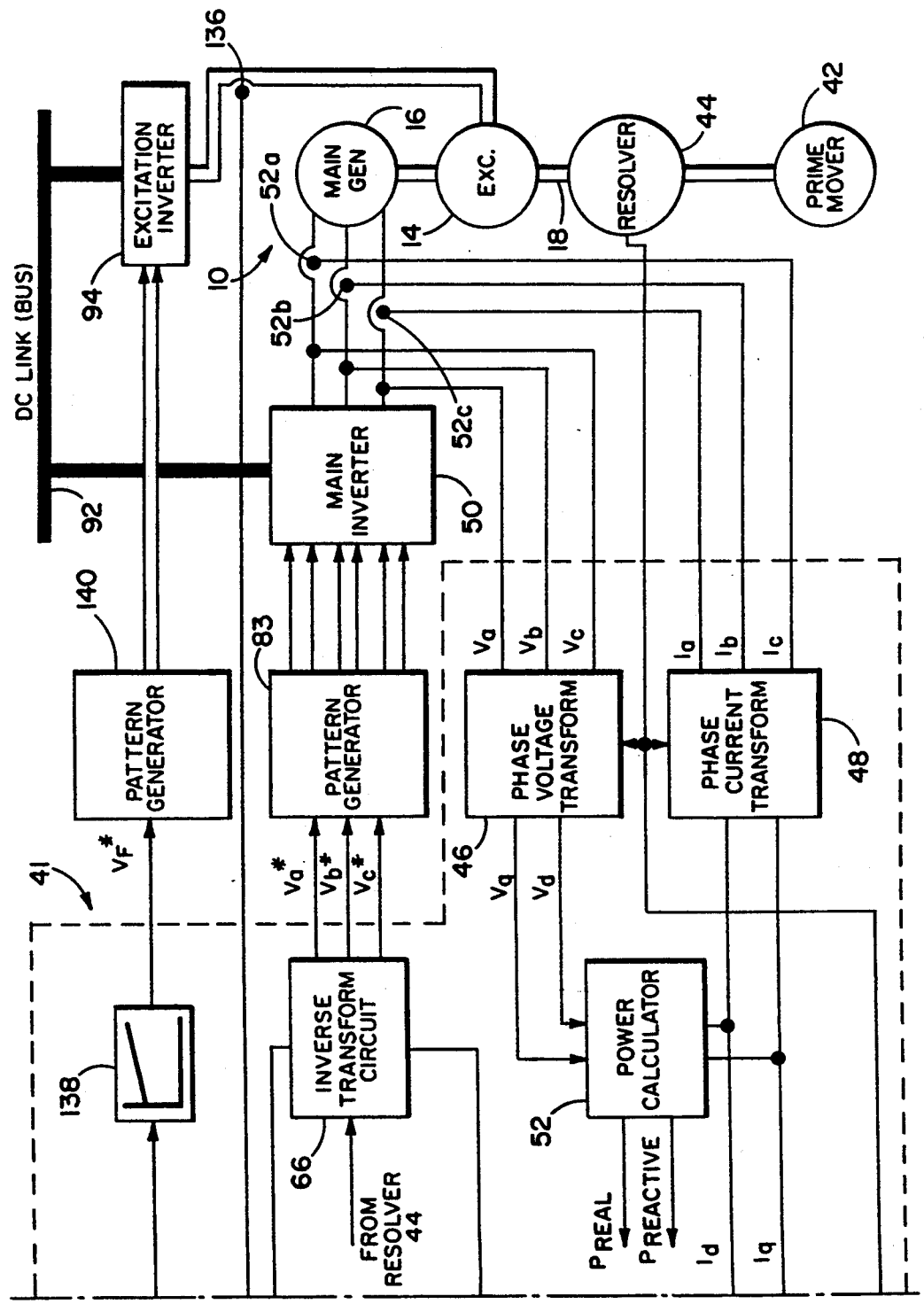

FIGS. 2A and 2B illustrate the exciter 14, the main generator 16 and the motive power shaft 18 of the generator 10 together with a starting system control 41 for operating the generator 10 in a starting mode to convert electrical power into motive power for starting a prime mover 42. Referring to FIG. 2B, the starting system control includes a rotor position detector in the form of a resolver 44 which develops a signal representing the position of the motive power shaft 18, and hence the rotor 20. The resolver signal is delivered to a phase voltage transformation circuit 46 and a phase current transformation circuit 48. The phase voltage transformation circuit 46 is responsive to phase voltages $V_a$, $V_b$ and $V_c$ developed by a first power source or power converter in the form of a pulse-width modulated (PWM) main inverter 50. The main inverter 50 is of the three-phase type and includes six controllable power switches and six flyback diodes connected in a conventional bridge configuration. The phase current transformation circuit 48 is responsive to signals $I_a$, $I_b$ and $I_c$ representing the magnitudes of phase currents developed by the main inverter 50, as detected by current sensors 52a–52c. The signals supplied to the circuits 46, 48 are expressed in terms relative to the stationary frame of reference of the stator 26. The circuits 46 and 48 are converters which implement Park's transformation to convert these signals into signals $V_d$, $V_q$ and $I_d$, $I_q$ in the d-q (or direct-quadrature) rotating frame of reference relative to the rotor 20.

The signals $V_d$, $V_q$ and $I_d$, $I_q$ are provided to a power calculator 52 which computes real and reactive power delivered to the generator according to the following equations:

$$P_{real} = I_d V_d + I_q V_q$$

$$P_{reactive} = I_q V_d - I_d V_q$$

Referring to FIG. 2A, the signals representing the real and reactive power magnitudes are supplied to summers 54, 56, which subtract such signals from signals representing a commanded real power and a commanded reactive power respectively. The output of the summer 56 is conditioned by a proportional-integral regulator 58, limited by a limiter 60 and supplied as a field command signal to a non-inverting input of a summer 62. An inverting input of the summer 62 receives the signal $I_d$ developed by the phase current transformation circuit 48 (FIG. 2B). The summer 62 develops an error signal representing the deviation of the field producing component developed by the main inverter 50 from a commanded field component magnitude and the error signal is conditioned by a proportional-integral (PI) regulator 64 and supplied to a first input of an inverse transformation circuit 66.

The output of the summer 54, representing the deviation of the real power magnitude from a commanded power magnitude is processed by a gain unit 68 and is provided to a selector comprising a low wins circuit 70. The low wins circuit 70 further receives an input from one of three start circuits 72, 74 and 76, described in greater detail hereinafter. The low wins circuit 70 supplies the signal having the least magnitude through a run-stop switch 78 to a non-inverting input of a summer 80. The signal provided by the low wins circuit 70 represents a commanded torque producing component $I_q*$ to be developed by the main inverter 50. The signal $I_q$ representing the magnitude of the torque producing component actually produced by the main inverter 50 is supplied to an inverting input of the summer 80 and the resulting error signal, representing the deviation of the actual and commanded torque producing component magnitudes, is processed by a PI regulator 82 and supplied to a second input of the inverse transformation circuit 66 (FIG. 2B).

The inverse transformation circuit 66 is responsive to the output of the resolver 44 and converts the signals developed by the PI regulators 64, 82 into three voltage commands $V_a^*$, $V_b^*$ and $V_c^*$ relative to a stationary frame of reference. The commands $V_a^*$, $V_b^*$ and $V_c^*$ are provided to a pattern generator 83 (FIG. 2B) which in turn develops six switch control patterns for the six switches in the three phase main inverter 50.

The run-stop switch 78 is used in certain circumstances, such as a failed start attempt, when the excitation to the system is suspended and then reapplied. In such a case, the run-stop switch 78, when set to the stop position, suspends only the torque producing component command $I_q^*$ by setting it to zero so that no motive power is developed by the generator 10. By not also setting the field producing component $I_d^*$ to zero, time that would otherwise be required to regenerate the field during restart is saved. The run-stop switch 78 is optional, and the particular manner in which it is implemented is not considered important to the invention.

The start circuit 72 develops a start signal which is provided by a switch 90 to the low wins circuit 70 in the event that DC power is to be supplied by a battery (not shown) over a DC bus 92 (FIG. 2B) to the main inverter 50 and a PWM excitation inverter 94 coupled to the field winding 28 of the exciter 14. A signal $V_{BT}$ representing the actual magnitude of battery voltage is supplied to a summer 96 which subtracts such signal from a commanded battery voltage signal $V_{BT}^*$. The resulting error signal is processed by a PI regulator 98 and is supplied by the switch 90 to the low wins circuit 70 as the start signal. This start signal ensures that the acceleration of the rotor matches the battery impedance so that the power drawn from the battery during the starting mode of operation does not exceed a level which would cause the battery voltage to drop to a level which would impair the operation of other loads connected thereto.

It should be noted that the excitation inverter 94 may be of the half-bridge or full-bridge type. In the former case, the inverter 94 includes two controllable power switches coupled to opposite ends of the field winding 28 together with four diodes. In the latter case, a pair of controllable power switches and associated flyback diodes are coupled to each end of the field winding 28.

As seen in FIG. 2A, the start circuit 74 comprises a reference signal generator 100 which develops a start signal that is supplied by the switch 90 to low wins circuit 70 in the event that a fast start cycle is to be implemented. The reference signal generator 100 develops a waveform of appropriate waveshape, such as a stepped waveform that quickly rises from zero volts up to a constant level of appropriate magnitude which in turn causes the main inverter 50 and the excitation inverter 94 to bring the generator 10 and the prime mover 42 up to a desired speed in as rapid a fashion as possible.

The start circuit 76 provides a programmable start signal to the switch 90 and the low wins circuit 70. A command generator 102 is responsive to a speed command signal generated by an APU controller 103. In response to the speed command signal, the command generator 102 develops a speed reference signal on a line 104 and a position reference signal on a line 106. The signal on the line 104 is supplied to a summer 108 which in turn subtracts a signal appearing on a line 110 therefrom. The signal on the line 110 is developed by an estimator 112 which is in turn responsive to the resolver output signal and a signal developed by a limiter 114 of the start circuit 76. The signal on the line 110 represents the estimated speed of the rotor 20. The summer 108 develops a speed error signal which is processed by a gain unit 115 and is supplied to a noninverting input of a summer 116.

The signal on the line 106 is supplied to a noninverting input of a summer 118 and a signal developed on a line 120 by the velocity estimator 112 and representing the estimated position of the rotor 20 is subtracted therefrom. The resulting position error signal is processed by a gain unit 122 and is supplied to an inverting input of the summer 116. The summer 116 subtracts the compensated position error signal from the compensated speed error signal to develop a torque command signal which is limited by the limiter 114. The resulting limited torque command signal is supplied by the switch 90 to the low wins circuit 70. The command generator 102 and the velocity estimator 112 are described in greater detail hereinafter in connection with FIG. 3.

The reactive power error signal is supplied by the summer 56 to a PI regulator 130 which also receives an enable signal on a line 132 from the limiter 60. The output of the regulator 130 represents a commanded field current magnitude $I_F^*$ for the exciter 14 and is supplied to a noninverting input of a summer 134. An inverting input of the summer 134 receives a signal representing the current magnitude $I_F$ supplied by the excitation inverter 94 to the exciter field winding 28 as detected by a current sensor 136, FIG. 2B. The resulting field current error signal is processed by a PI regulator 138 (FIG. 2B) to produce a voltage command which is supplied to a pattern generator 140. The pattern generator 140 develops appropriate patterns for the switches in the inverter 94 to cause the exciter field current to approach the commanded current magnitude.

Figure 3:
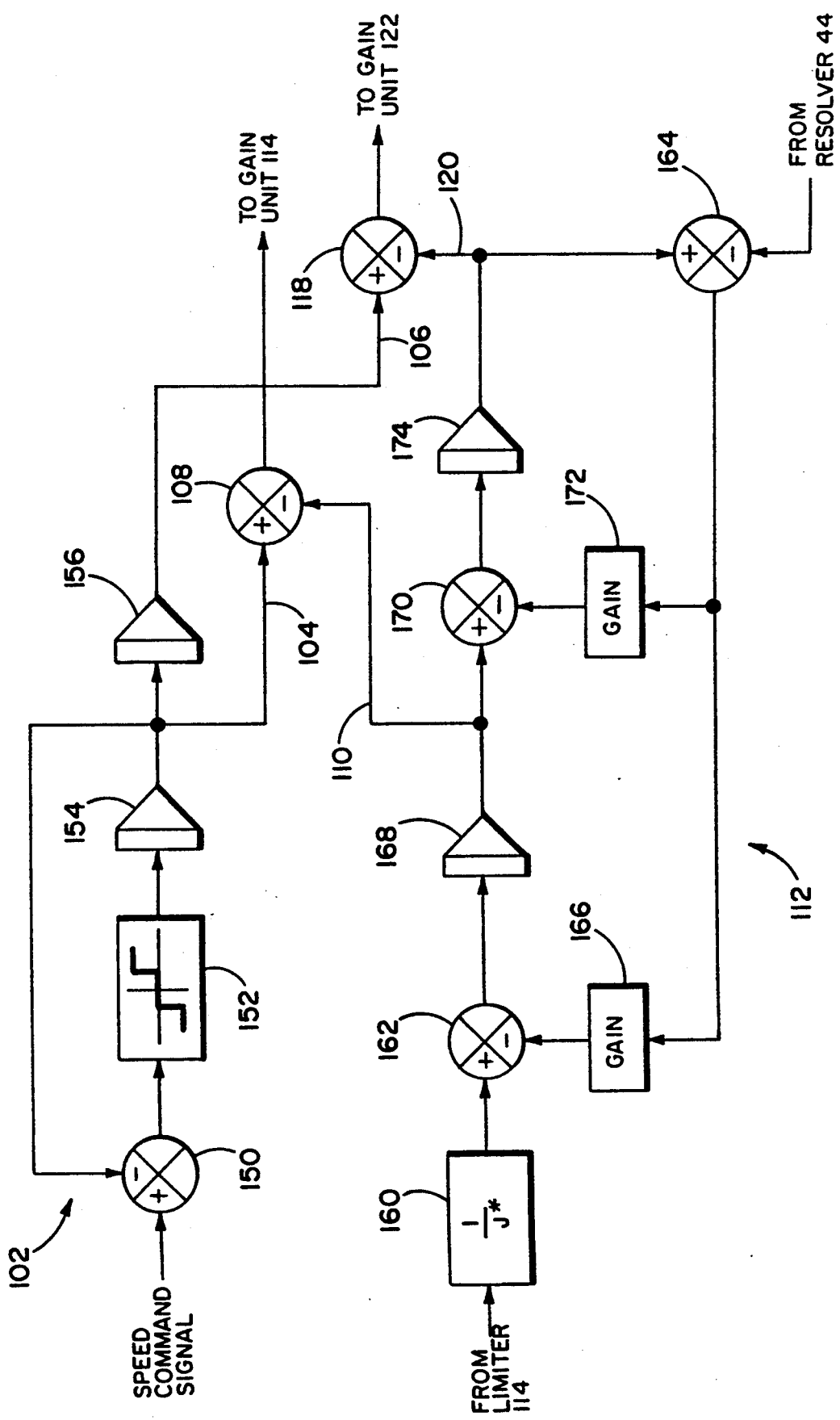
FIG. 3 is a block diagram of the command generator and velocity estimator of FIG. 2A.

Referring now to FIG. 3, the command generator 102 and the velocity estimator 112 are shown in greater detail together with the summers 108 and 118. The speed command signal is supplied to a noninverting input of a summer 150 that develops an output which is processed by a function generator 152. The function generator 152 converts the error signal developed by the summer 150 into an acceleration reference signal which is integrated by an integrator 154 and supplied to a further integrator 156 and to the summer 108. The output of the integrator 154 is further supplied back to an inverting input of the summer 150, and hence the components 150, 152 and 154 comprise a closed-loop reference signal generator. The integrator 154 produces the speed reference signal which is provided to the noninverting input of the summer 108. The integrator 156 converts the speed reference signal into the position reference signal which is supplied over the line 106 to the noninverting input of the summer 118.

The output of the limiter 114 is supplied to a scaler 160 which multiplies the limiter signal with a signal representing the reciprocal of the inertia of the rotor 20. The resulting signal is provided to a noninverting input of a summer 162, The output of the resolver 44, which may contain noise that may affect system operation, is supplied to an inverting input of a summer 164 which further includes a noninverting input which receives the estimated position signal on the line 120. The resulting error signal developed by the summer 164 is processed by a gain unit 166 and is supplied to an inverting input of the summer 162. The output of the summer 162, which represents the estimated acceleration of the rotor 20, is integrated by an integrator 168 to produce the speed estimate signal on the line 110. The speed estimate signal is further supplied to a noninverting input of a summer 170. A gain unit 172 multiplies the error signal developed by the summer 164 and the resulting signal is provided to an inverting input of the summer 170. The output of the summer 170 is processed by a further integrator 174 which in turn produces the position estimate signal. The velocity estimator 112 avoids the noise problems associated with utilizing the output of the resolver 44 along with a simple differentiator.

It should be noted that some or all of the components of the control 40 may be implemented in whole or in part by a digital signal processor or any other suitable hardware and/or software, as desired.

During starting operation, the control operates the generator 10 in two modes, referred to as the maximum torque per amp mode and the unity power factor mode. At low speeds, e.g., when rotor speed is less than approximately 5500 RPM, the maximum torque per amp mode is implemented, which reduces starting times at lower speeds. At zero and low speeds, the field command signal $I_d^*$ is set by the limiter 60 to the value which provides the maximum torque per amp ratio, which value is a function of motor parameters. At increasing speeds, the reactive power increases. When the error signal at the output of the summer 56 becomes negative, the limiter 60 eventually allows the output of the PI regulator 58 to pass to the summer 62 and therefore increases the commutation angle which causes a reduction in torque. When an upper limit is reached by the limiter 60, an enable signal is provided over the line 132 to the regulator 130, enabling it to reduce the field command signal for the exciter. From this point, the field current supplied by the excitation inverter 94 is reduced inversely proportional to speed. The commutation angle is increased to maintain the required (commanded) reactive power level. When the commutation angle reaches the limit thereof, a field current command performs this function by reducing the exciter field current to satisfy reactive power requirements.

Figure 4:
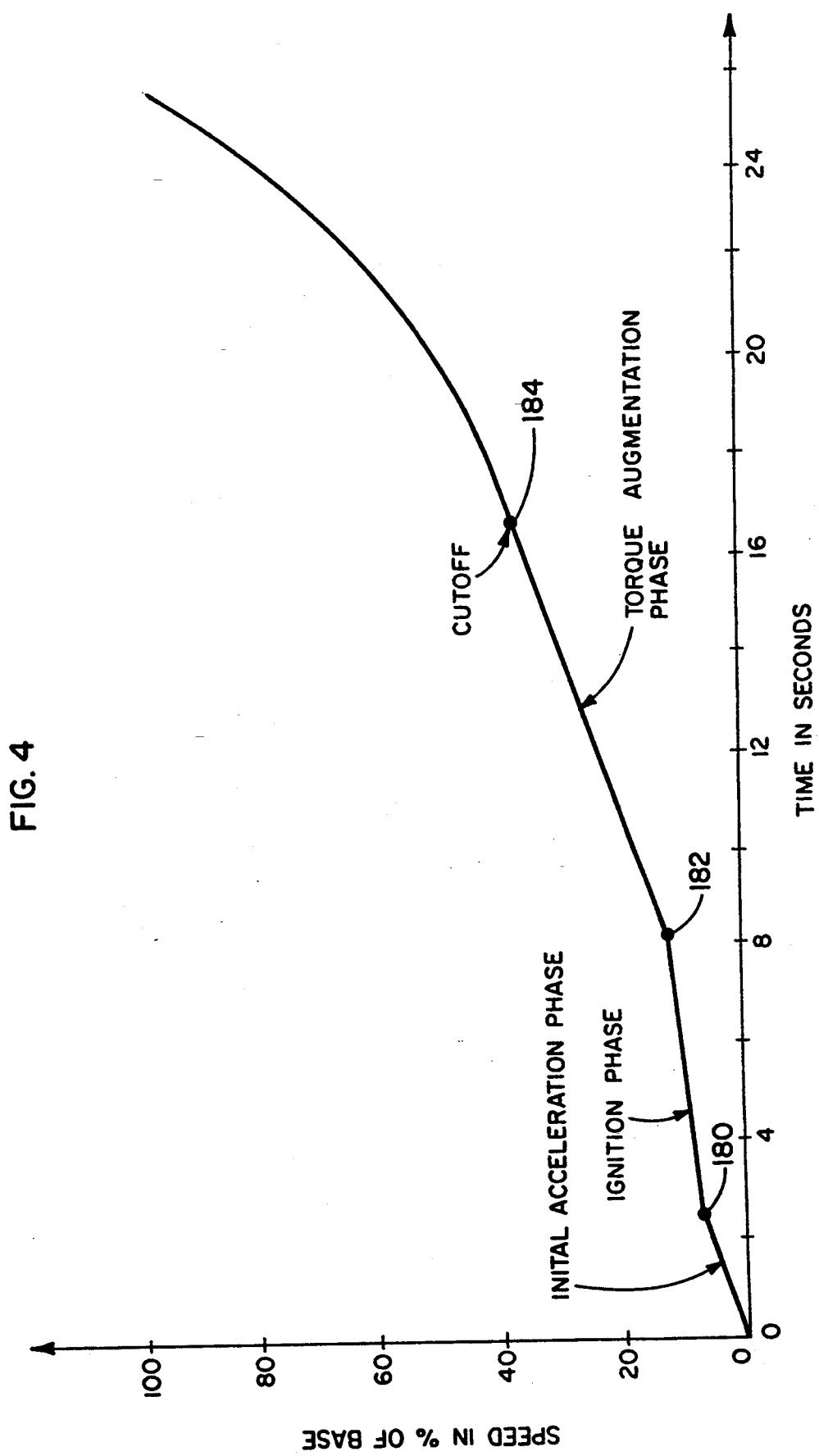
FIG. 4 comprises a graph illustrating the relationship between speed and time for a starting sequence effected by the control of FIGS. 2A and 2B.

The preferred starting method of the invention is accomplished with the switch 90 connected to the output of the limiter 114 of the programmable start circuit 76. As illustrated in FIG. 4, during the preferred starting mode of operation of the system, the prime mover is accelerated at a controlled rate during each of three different phases: an initial acceleration phase, an ignition phase and a torque augmentation phase. During each of the phases, the acceleration of the prime mover is controlled by the speed command signal generated by the APU controller 103.

The initial acceleration phase begins upon commencement of start-up of the prime mover and ends when the prime mover has been accelerated to a predetermined speed. Preferably, that speed is the minimum speed at which ignition of the prime mover is likely, e.g., about seven percent of rated operating speed, and is designated as point 180 in FIG. 4. During the initial acceleration phase, the magnitude of the speed command generated by the APU controller 103 increases at a first constant, predetermined rate so that the acceleration of the prime mover is substantially constant.

During the ignition phase, the prime mover is accelerated at a second, predetermined level which is lower than the acceleration level of the initial acceleration phase, and fuel and a source of ignition are supplied to the prime mover. The ignition phase begins at the minimum speed at which ignition is likely to occur and lasts until ignition of the prime mover, which is detected typically by an exhaust gas temperature sensor 181 (shown in FIG. 2A), which provides a signal to the APU controller 103 indicating the ignition of the prime mover.

If the prime mover fails to ignite within a predetermined period of time, e.g., five seconds, after the beginning of the ignition phase, at which point the prime mover reaches the maximum speed at which ignition is likely to occur, e.g., twelve percent of rated operating speed, the ignition phase is aborted and the start sequence can be repeated. When the ignition phase is aborted, the run-stop switch 78 is switched to its stop position, and subsequently to its run position when the start sequence is restarted.

Upon ignition, the torque augmentation phase begins at a point designated 182 in FIG. 4. During the torque augmentation phase, the speed of the prime mover is controlled to increase at a predetermined rate to minimize the energy used consistent with reliable starting.

As the rotational speed of the prime mover increases during the torque augmentation phase, the amount of torque developed by the prime mover gradually increases. Since the acceleration of the prime mover is controlled at a predetermined level, the amount of torque provided by the synchronous machine 10 gradually decreases during this phase. At a particular cutoff point, designated point 184 in FIG. 4, the amount of torque provided by the synchronous machine is reduced to a very low value, e.g., five footpounds. When this point is reached, typically between about 55% and 90% of the rated operating speed of the prime mover, electrical power to the synchronous machine is cut off. Thereafter, when a further certain point is reached, such as 90% of rated operating speed, the synchronous machine is converted from the starting mode to the generating mode. After this point, the prime mover continues to accelerate to operating speed.

The cutoff point 184 may be determined by the APU controller 103 by comparing the power being supplied to the synchronous machine 10 by the main inverter 50 with a predetermined power versus torque and speed characteristic for the synchronous machine 10. Alternatively, the cutoff point 184 could be the point at which the current drawn by the synchronous machine 10 reaches a predetermined lower limit. The particular manner of determining the cutoff point is not considered important to the invention.

Where a dedicated starter motor coupled to the prime mover via a clutch is used instead of a synchronous machine operable in both starting and generating modes, the starter motor is disengaged from the prime mover via the clutch when the cutoff point is reached. As used herein, the term "starter motor" includes, but is not limited to, both a synchronous machine operable in starting and generating modes and a dedicated starter motor.

While the above method has been described in connection with a detailed circuit diagram, the details of the circuitry are not considered to be important to the invention, and many other circuit designs could be used.

Numerous additional modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A method of controllably starting a prime mover in which the prime mover is coupled to a starer motor which provides motive power to the prime mover to accelerate the prime mover to self-sustaining speed, said method comprising the steps of:
   (a) during a first phase prior to ignition of the prime mover, causing the starter motor to provide motive power to the prime mover so as to accelerate the prime mover at a first predetermined rate;
   (b) during a second phase subsequent to said first phase, causing the starter motor to provide motive power to the prime mover so as to accelerate the prime mover at a second predetermined rate which is less than said first predetermined rate;
   (c) during said second phase, providing fuel to the prime mover to facilitate ignition of the prime mover; and
   (d) during a third phase subsequent to the ignition of the prime mover, causing the starter motor to provide motive power to the prime mover so as to accelerate the prime mover at a third predetermined rate.

2. A method as defined in claim 1 wherein the starter motor is a synchronous machine operable in a starting mode in which the synchronous machine provides motive power to the prime mover and in a generating mode in which the synchronous machine converts motive power generated by the prime mover into electrical power, said method additionally comprising the steps of:
   (e) during said third phase, detecting when the motive power provided by the synchronous machine falls below a predetermined level; and
   (f) converting the synchronous machine from said starting mode to said generating mode when the motive power provided by the synchronous machine falls below a predetermined level as determined in said step (e).

3. A method as defined in claim 1 additionally comprising the step of (e) during said second phase, detecting the ignition of the prime mover, and wherein said step (d) begins immediately following ignition of the prime mover as detected in said step (e).

4. A method of controllably starting a prime mover in which the prime mover is coupled to a starter motor which provides motive power to the prime mover to accelerate the prime mover to self-sustaining speed, said method comprising the steps of:
   (a) during a first phase prior to ignition of the prime mover, causing the starter motor to provide motive power to the prime mover so as to accelerate the prime mover at a first predetermined rate;
   (b) during a second phase subsequent to said first phase, causing the starter motor to provide motive power to the prime mover so as to accelerate the prime mover at a second predetermined rate;
   (c) during said second phase, providing fuel to the prime mover to facilitate ignition of the prime mover;
   (d) during a third phase subsequent to the ignition of the prime mover, causing the starter motor to provide motive power to the prime mover so as to accelerate the prime mover at a third predetermined rate; and wherein
   the first predetermined rate and the third predetermined rate are both greater than the second predetermined rate.

5. A method of controllably starting a prime mover in which the prime mover is coupled to a synchronous machine operable in a generating mode in which the synchronous machine converts motive power generated by the prime mover into electrical power and in a starting mode in which the synchronous machine provides motive power to the prime mover to accelerate the prime mover to self-sustaining speed, said method comprising the steps of:
   (a) during a first phase prior to ignition of the prime mover, causing the synchronous machine to operate in said starting mode to provide motive power to the prime mover so as to accelerate the prime mover at a first predetermined rate;
   (b) during a second phase subsequent to said first phase, causing the synchronous machine to operate in said starting mode to provide motive power to the prime mover so as to accelerate the prime mover at a second predetermined rate which is less than said first predetermined rate;
   (c) during said second phase, providing fuel to the prime mover to facilitate ignition of the prime mover;
   (d) during said second phase, detecting the ignition of the prime mover;
   (e) during a third phase subsequent to the ignition of the prime mover, causing the synchronous machine to operate in said starting mode to provide motive power to the prime mover so as to accelerate the prime mover at a third predetermined rate;
   (f) during said third phase, detecting when the motive power provided by the synchronous machine falls below a predetermined level; and
   (g) converting the synchronous machine from said starting mode to said generating mode after the motive power provided by the synchronous machine falls below a predetermined level as determined in said step (f).

6. A method as defined in claim 5 wherein the first predetermined rate and the third predetermined rate are both greater than the second predetermined rate.

7. A method as defined in claim 5 wherein said step (e) begins immediately following ignition of the prime mover as detected in said step (d).

8. A method of controllably starting a prime mover in which the prime mover is coupled to a starter motor which provides motive power to the prime mover to accelerate the prime mover to self-sustaining speed, said method comprising the steps of:
   (a) during a first phase prior to ignition of the prime mover, causing the starter motor to provide motive power to the prime mover so as to accelerate the prime mover;
   (b) during a second phase subsequent to said first phase, causing the starter motor to provide motive power to the prime mover so as to accelerate the prime mover at a predetermined rate slower than the acceleration of step (a); and
   (c) during said second phase, providing fuel to the prime mover to facilitate ignition of the prime mover.

9. A method as defined in claim 8 additionally comprising the step of:

(d) during a third phase subsequent to the ignition of the prime mover, causing the starter motor to provide motive power to the prime mover so as to accelerate the prime mover at a second predetermined rate.

10. A method as defined in claim 9 additionally comprising the step of (e) during said second phase, detecting the ignition of the prime mover, and wherein said step (d) begins immediately following ignition of the prime mover as detected in said step (e).

11. A method as defined in claim 8 wherein the starter motor is coupled to the prime mover via a clutch, said method additionally comprising the steps of:
(e) during said third phase, detecting when the motive power provided by the starter motor falls below a predetermined level; and
(f) disengaging the starter motor from the prime mover via the clutch when the motive power provided by the starter motor falls below a predetermined level as determined in said step (e).

12. A method as defined in claim 8 wherein the starter motor is a synchronous machine operable in a starting mode in which the synchronous machine provides motive power to the prime mover and in a generating mode in which the synchronous machine converts motive power generated by the prime mover into electrical power, said method additionally comprising the steps of:
(e) during said third phase, detecting when the motive power provided by the synchronous machine falls below a predetermined level; and
(f) converting the synchronous machine from said starting mode to said generating mode after the motive power provided by the synchronous machine falls below a predetermined level as determined in said step (e).

13. A method of controllably starting a prime mover in which the prime movers is coupled to a start motor which provides motive power to the prime mover to accelerate the prime mover to self-sustaining speed, said method comprising the steps of:
(a) during a first phase prior to ignition of the prime mover, causing the starter motor to provide motive power to the prime mover so as to accelerate the prime mover;
(b) during a second phase subsequent to said first phase, causing the starter motor to provide motive power to the prime mover so as to accelerate the prime mover at a predetermined rate;
(c) during said second phase, providing fuel to the prime mover to facilitate ignition of the prime mover;
(d) during a third phase subsequent to the ignition of the prime mover, causing the starter motor to provide motive power to the prime mover so as to accelerate the prime mover at a second predetermined rate, and wherein
the prime mover is accelerated at a third predetermined rate during said step (a), wherein the predetermined rate of step (a) is greater than the predetermined rate of step (b), and wherein the predetermined rate of step (d) is greater than the predetermined rate of step (b).

14. A method of controllably starting a prime mover in which the prime mover is coupled to a starter motor to provide motive power to the prime mover to accelerate the prime mover to self-sustaining speed, said method comprising the steps of:
(a) during a first phase prior to ignition of the prime mover, causing the starter motor to provide motive power to the prime mover so as to accelerate the prime mover to an initial rotational speed at a first predetermined rate;
(b) during a second phase subsequent to said first phase, causing the starter motor to provide motive power to the prime mover so as to accelerate the prime mover to a rotational speed greater than said initial rotational speed at a second predetermined rate slower than said first predetermined rate;
(c) during said second phase, providing fuel to the prime mover to facilitate ignition of the prime mover;
(d) during a third phase subsequent to the ignition of the prime mover, causing the starter motor to provide motive power to the prime mover so as to accelerate the prime mover at a third predetermined rate.

15. A method as defined in claim 14 wherein the predetermined rates of steps (a), (b), and (d) are specified by an electronic control signal having a characteristic relating to said predetermined rates.

16. A method as defined in claim 15 wherein the characteristic of the electronic signal is magnitude.

17. A method as defined in claim 14 additionally comprising the step of (e) during said second phase, detecting the ignition of the prime mover, and wherein said step (d) begins immediately following ignition of the prime mover as detected in said step (e).

18. A method as defined in claim 14 wherein the starter motor is a synchronous machine operable in a starting mode in which the synchronous machine provides motive power to the prime mover and in a generating mode in which the synchronous machine converts motive power generated by the prime mover into electrical power, said method additionally comprising the steps of:
(e) during said third phase, detecting when the motive power provided by the synchronous machine falls below a predetermined level; and
(f) converting the synchronous machine from said starting mode to said generating mode after the motive power provided by the synchronous machine falls below a predetermined level as determined in said step (e).

19. A method of controllably starting a prime mover in which the prime mover is coupled to a starter motor to provide motive power to the prime mover to accelerate the prime mover to self-sustaining speed, said method comprising the steps of:
(a) during a first phase prior to ignition of the prime mover, causing the starter motor to provide motive power to the prime mover so as to accelerate the prime mover to an initial rotational speed;
(b) during a second phase subsequent to said first phase, causing the starter motor to provide motive power to the prime mover so as to accelerate the prime mover to a rotational speed greater than said initial rotational speed;
(c) during said second phase, providing fuel to the prime mover to facilitate ignition of the prime mover;
(d) during a third phase subsequent to the ignition of the prime mover, causing the starter motor to provide motive power to the prime mover so as to accelerate the prime mover at a predetermined rate; and wherein the prime mover is accelerated at a second predetermined rate during said step (b); and wherein
the prime mover is accelerated at a third predetermined rate during said step (a); and wherein
the predetermined rate of step (a) and the predetermined rate of step (d) are both greater than the predetermined rate of step (b).

* * * * *